United States Patent
Dewald et al.

(10) Patent No.: US 6,637,894 B2
(45) Date of Patent: Oct. 28, 2003

(54) HIGH CONTRAST PROJECTION

(75) Inventors: D. Scott Dewald, Dallas, TX (US);
Steven M. Penn, Plano, TX (US);
Dana J. Segler, Jr., Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/092,043

(22) Filed: Mar. 5, 2002

(65) Prior Publication Data

US 2002/0126264 A1 Sep. 12, 2002

Related U.S. Application Data

(60) Provisional application No. 60/273,756, filed on Mar. 6, 2001.

(51) Int. Cl.$^7$ .............................. G03B 21/14; G02B 9/08
(52) U.S. Cl. ........................ 353/97; 359/740; 359/739
(58) Field of Search .................... 359/740, 739; 353/97

(56) References Cited

U.S. PATENT DOCUMENTS

| | | | |
|---|---|---|---|
| 5,442,414 A | * | 8/1995 | Janssen et al. .............. 353/98 |
| 5,519,518 A | * | 5/1996 | Watanabe et al. ........... 349/57 |
| 5,622,418 A | * | 4/1997 | Daijogo et al. ............. 353/97 |
| 5,662,401 A | * | 9/1997 | Shimizu et al. ............. 353/38 |
| 5,947,576 A | * | 9/1999 | Sato et al. .................. 353/70 |
| 6,224,216 B1 | * | 5/2001 | Parker et al. ............... 353/31 |
| 6,231,195 B1 | * | 5/2001 | Gutin ........................ 359/614 |

\* cited by examiner

Primary Examiner—Russell Adams
Assistant Examiner—Andrew Sever
(74) Attorney, Agent, or Firm—Charles A. Brill; Wade James Brady, III; Frederick J. Telecky, Jr.

(57) ABSTRACT

A method and system for improving the contrast ratio of a projected image. An asymmetric aperture stop within a lens is used to provide a 20–30% improvement in the contrast ratio of a projected image when used with offset projection. Using slightly offset projection, the majority of the on-state projection light from the modulator array passes through a region (512) that is not centered in the projection lens pupil. The blocked region (504) of the asymmetric aperture is oriented toward the illumination path (510) and away from the specular reflection path (508). The asymmetric aperture (502) is able to block a significant portion of the diffracted light using the blocked region (504), without blocking much of the desired projection light passing through the remainder of the aperture. The result is that dark regions of the image become significantly darker, while light regions remain about the same. The same effect occurs without the offset illumination shown in FIG. 3, but to a lesser extent. The preceding abstract is submitted with the understanding that it only will be used to assist in determining, from a cursory inspection, the nature and gist of the technical disclosure as described in 37 C.F.R. §1.72(b). In no case should this abstract be used for interpreting the scope of any patent claims.

9 Claims, 3 Drawing Sheets

HIGH CONTRAST PROJECTION

This application claims priority under 35 USC §119(e)(1) of provisional application No. 60/273,756 filed Mar. 6, 2001.

FIELD OF THE INVENTION

This invention relates to the field of lens systems, more particularly to lens systems used with micromirror based projection display systems.

BACKGROUND OF THE INVENTION

Micromirror projection display systems are rapidly gaining acceptance in a wide variety of applications, from sub-three pound portable projectors to cinema-quality projectors. The cinema projectors provide the image quality of traditional film projectors, without the expense and degradation associated with filmstrip projection. Existing cinema projectors provide contrast ratios in excess of 1000:1. What is needed is a method of increasing the contrast ratio of micromirror projectors.

SUMMARY OF THE INVENTION

Objects and advantages will be obvious, and will in part appear hereinafter and will be accomplished by the present invention which provides a method and system for increasing the contrast ratio of a display system. One embodiment of the claimed invention provides a lens system. The lens system comprising: a first lens group on a light path; a second lens group on the light path; and an asymmetric aperture stop on the light path between the first and second groups.

Another embodiment of the present invention provides a display system. The display system comprising: a light source for providing a beam of light along an illumination path; a micromirror device on the illumination path for receiving the beam of light and selectively reflecting the beam of light along a projection path; a lens system on the projection path. The lens system comprises: at least one lens; and an asymmetric aperture stop receiving light from at least one of the lenses.

Yet another embodiment of the present invention provides a method of projecting an image. The method comprises: receiving an illumination light beam along an illumination path; selectively reflected the illumination light beam along a projection path in response to image data; focusing selectively reflected light using a projection lens; and blocking a portion of light passing through the projection lens using an asymmetric aperture.

According to one embodiment of the present invention, the asymmetric aperture stop is formed by adding a blocking region to an otherwise circular aperture. The blocking region is oriented towards the illumination path and away from a spectral reflection path. One embodiment uses a crescent shaped blocking region. The thickness of the crescent is 17% of the diameter of the aperture. The inside radius of the crescent is equal to the radius of the circular portion of the aperture. Alternative embodiment use blocking regions having other shapes.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE PREFERRED EMBODIMENTS

A new method and system for projecting an image has been developed. The method and system use an asymmetric aperture stop in a projection lens to block scattered light without blocking the desired projection light. The method and system provide an 20–30% improvement in contrast when applied to a micromirror-based display system using off-axis illumination.

Figure 1:
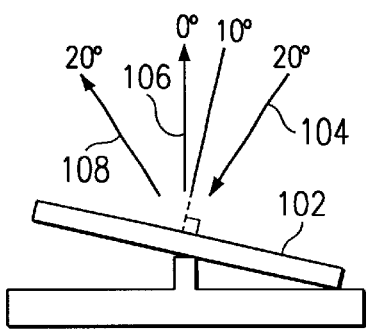
FIG. 1 is a schematic side view of a single micromirror element in a first deflected position showing the path of illumination light and reflected projection light.
Figure 2:
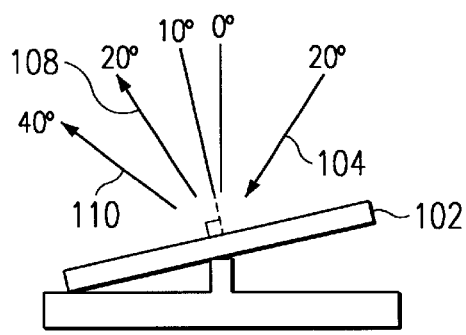
FIG. 2 is a schematic side view of a single micromirror element in a second deflected position showing the path of illumination light and reflected light.
Figure 3:
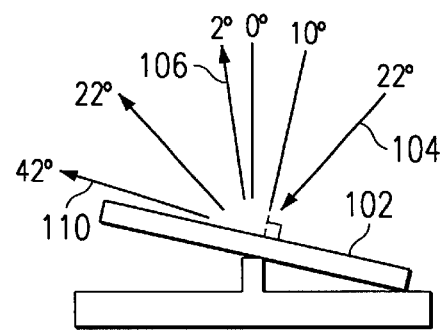
FIG. 3 is a schematic side view of a single micromirror element in a first deflected position showing the path of shifted illumination light and reflected projection light.

FIG. 1 is a schematic side view of a single micromirror element in a first deflected position showing the path of illumination light and reflected projection light. In FIG. 1, a single element or mirror 102 of a micromirror device is shown. Most useful micromirror devices have many mirrors, often on the order of one million. The mirror 102 of FIGS. 1–3 is operable to tilt 10° in one of two directions. The mirror 102 is tilted to a first position in FIG. 1. The first position shown in FIG. 1 is often called the "on" position since it causes light from a source to be reflected approximately normal to the surface of the micromirror array to a projection lens. The projection lens focuses the light onto an image plane such that the light from an "on" mirror creates a bright pixel. Of course, the conventions described herein can be altered without destroying the application of this invention.

In FIG. 1, the illumination path 104, the path of the light from a light source, strikes the micromirror at an angle of 20° relative to the normal of the mirror when it is not deflected. The mirror 102 is rotated about an axis perpendicular to the plane of FIG. 1 in a clockwise direction towards the illumination path 104 at an angle of one-half of the angle of the illumination path. The result is the light reflected by the on-state mirror is reflected along a path 106 normal to the plane of the device.

In addition to the light reflected by the mirror 102, light is reflected by the structures surrounding the mirror 102, including any aperture around the mirror array (not shown). Reflection by structures parallel to the plane of the array is considered specular reflection or flat state reflection and follows specular path 108.

In addition to the specular reflection and the light reflected by the deflected mirrors, light striking between the mirrors may be scattered by multiple reflections from structures under the mirrors and the underside of the mirrors. Light is also diffracted by the edges of the structures. Scattered light and diffracted light exit the micromirror array in virtually all directions. The scattered light and diffracted light reaching the projection lens tend to raise the black level of the projected image. This lowers the contrast ratio of the image since the contrast ratio is the ratio of a maximum brightness pixel and a minimum brightness pixel.

FIG. 2 is a schematic side view of the single micromirror 102 of FIG. 1 in a second deflected position. In FIG. 2, the mirror is rotated 10° in a direction opposite the "on" direction shown in FIG. 1. In FIG. 2, light at a 20° illumination angle is reflected by the "off-state" pixel at an angle 40° away from the normal angle. Comparing FIGS. 1 and 2 shows a 40° separation between on-state light and off-state light, and a 20° separation between illumination light and on-state light.

Separation between the illumination path 104 and the projection path 106 is necessary to prevent interference of the light source optics and the projection optics. Separation between the projection path 106 and the off-state light path 110, or dump light path, is necessary to allow the projection optics to collect the on-state light while avoiding the off-state light. The projection optics should also avoid collecting the specularly reflected light, the scattered light, and the diffracted light.

FIG. 3 is a schematic side view of the single micromirror element 102 in the first deflected position showing the illumination light path shifted away from the device normal in the illumination direction. Typically, a micromirror that is capable of rotating 10° in either direction is illuminated at an angle of 22°. Keeping the axis of the projection lens normal to the micromirror array when using a 22° illumination angle in combination with a 10° micromirror tilt angle provides a separation between the projection lens and the illumination path of 22°, a 22° separation between the projection lens and the specular reflections, and a 42° separation between the projection lens and the off-state light. This increased separation has been found to reduce the amount of specular reflection entering the pupil of the projection lens.

Figure 4:
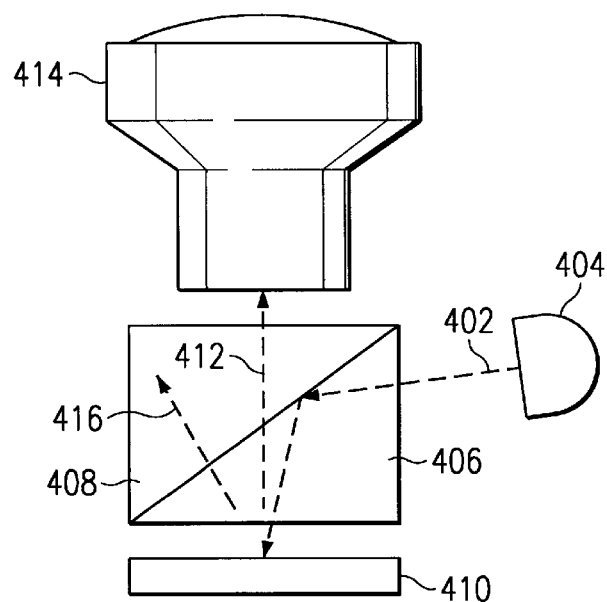
FIG. 4 is a side view of a portion of a display system showing illumination and projection paths passing through a prism assembly.

One common method of further separating the projection and illumination paths is shown in FIG. 4. FIG. 4 is a side view of a portion of a display system showing illumination and projection paths passing through a prism assembly. Light 402 from a light source 404 enters a first prism 406 and is reflected at an interface between the first prism 406 and a second prism 408. The reflected light travels to the micromirror array 410 and is selectively reflected by the array depending on the state of the mirrors. Light reflected by the on-state mirrors travels along path 412 and, because it strikes the interface at a steeper angle than the illumination light, passes through the interface and enters a projection lens 414. Light reflected by the off-state mirrors follows path 416 and does not enter the pupil of the projection lens 414.

Figure 5:
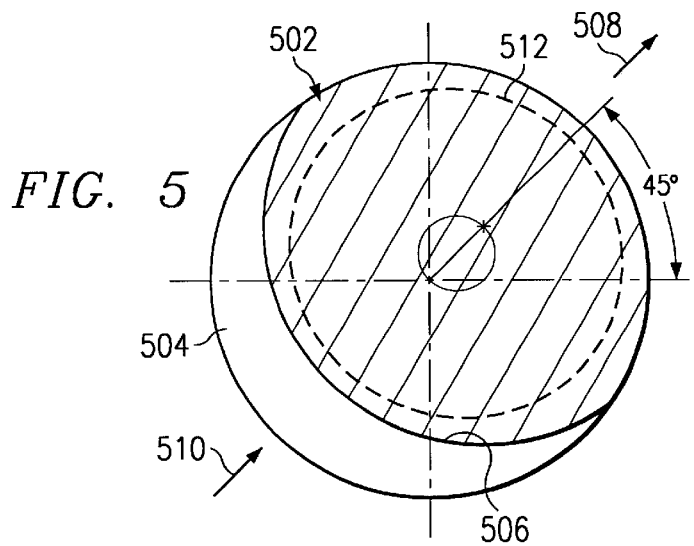
FIG. 5 is a plan view of a pupil in a projection lens showing one embodiment of an asymmetric aperture.

FIG. 5 is a plan view of a pupil of a projection lens showing one embodiment of an asymmetric aperture. In FIG. 5, the aperture stop forms an asymmetric aperture, shown by cross-hatched region 502. The asymmetric aperture has a predominately circular shape, but a portion 504 of the circular aperture is blocked. The aperture stop may be formed using multiple components, including lens holders or other components of the lens such as the lens barrel.

In a preferred embodiment, the blocked region is a crescent shape with an inside edge 506 having a radius equal to the radius of the circular portion of the aperture. The center of curvature of the inside edge is shifted away from the center of the circular aperture by approximately 17% of the diameter of the circular portion of the aperture in a direction toward the specular reflection 508 and away from the illumination path 510.

Figure 6:
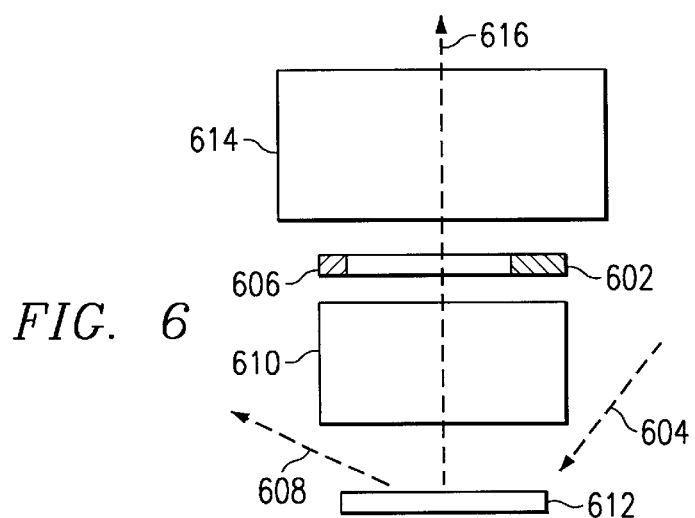
FIG. 6 is a side view of a portion of a display system showing an orientation of the asymmetrical aperture stop of FIG. 5.

As shown in FIG. 6, this arrangement orients the blocking portion 602 of the aperture stop toward the illumination path 604, and the thinner portion 606 of the aperture stop toward the specular reflection path 608. Also shown in FIG. 6 are a first lens group 610 located between the aperture stop and the spatial light modulator 612 and a second lens group 614 on the projection path 616 on an opposite side of the aperture stop from the first lens group 610. Both of the lens groups 610, 614 may comprise a single lens or more than one lens.

The asymmetric aperture stop described above provides a 20–30% improvement in the contrast ratio of a projected image. Returning to FIG. 5 it is seen that the majority of the on-state projection light from the modulator array passes through a region 512 that is not centered in the projection lens. This offset, while not necessary to the operation of this present invention, is caused by the increased illumination angle of FIG. 3 which results in the projection lens operating in a slightly offset mode. The asymmetric aperture 502 is able to block a significant portion of the diffracted light using the blocked region 504, without blocking much of the desired projection light passing through the remainder of the aperture. The result is that dark regions of the image become significantly darker, while light regions remain about the same. The same effect occurs without the offset illumination shown in FIG. 3, but to a lesser extent.

Figure 7:
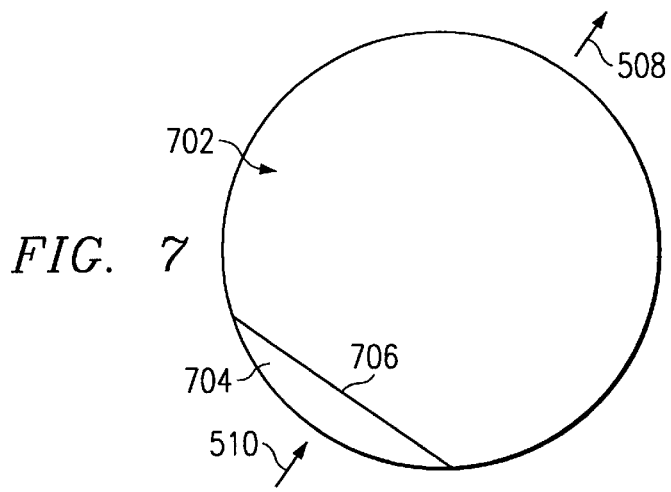
FIG. 7 is a plan view of a pupil in a projection lens showing another embodiment of an asymmetric aperture.

FIG. 7 is a plan view of a pupil in a projection lens showing another embodiment of an asymmetric aperture 702. In FIG. 7, a circular aperture is blocked over region 704. As with the other examples described herein, the basic aperture need not be circular. The blocked region 704 of FIG. 7 is defined by a straight edge 706.

Figure 8:
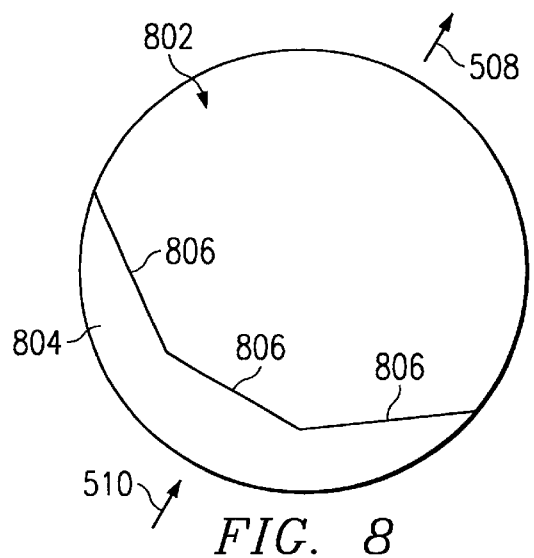
FIG. 8 is a plan view of a pupil in a projection lens showing another embodiment of an asymmetric aperture.

FIG. 8 is a plan view of a pupil in a projection lens showing another embodiment of an asymmetric aperture 802. In FIG. 8, the otherwise circular aperture is blocked over region 804. The blocked region 804 is defined by three straight edges 806 and the circular perimeter of the basic aperture.

Figure 9:
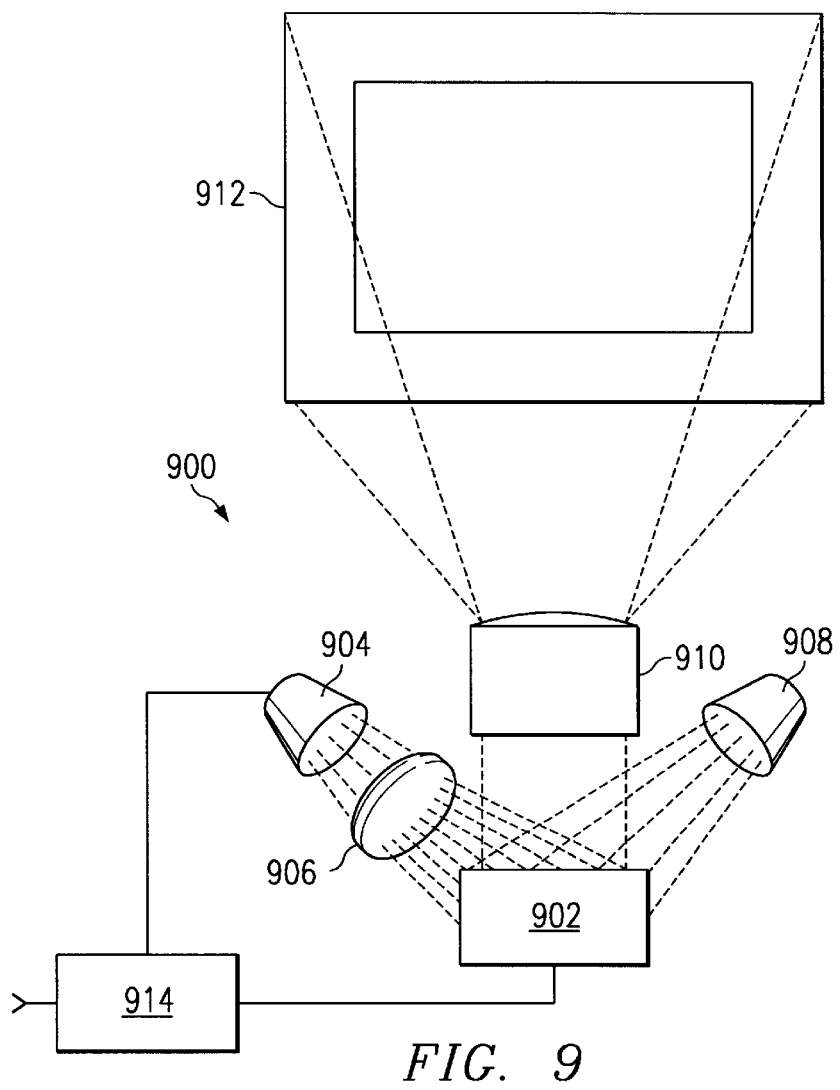
FIG. 9 is a schematic view of a micromirror-based projection system utilizing an improved projection lens according to one embodiment of the present invention.

FIG. 9 is a schematic view of a micromirror-based projection system 900 utilizing an improved projection lens 910 according to one embodiment of the present invention. In FIG. 9, light from light source 904 is focused on the spatial light modulator 902 by lens 906. Although shown as a single lens, lens 906 is typically a group of lenses and mirrors which together focus and direct light from the light source 904 onto the surface of the micromirror device 902. Image data and control signals from controller 914 cause some mirrors to rotate to an on position and others to rotate to an off position. Mirrors on the micromirror device that are rotated to an off position reflect light to a light trap 908 while mirrors rotated to an on position reflect light to projection lens 910. Projection lens 910 includes the asymmetric aperture stop and focuses the light modulated by the spatial light modulator device 902 onto an image plane or screen 912.

Thus, although there has been disclosed to this point a particular embodiment for a high contrast lens, display system, and method therefore, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims. In the following claims, only elements denoted by the words "means for" are intended to be interpreted as means plus function claims under 35 U.S.C. §112, paragraph six.

What is claimed is:

1. A display system comprising:
   a light source for providing a beam of light along an illumination path;
   a micromirror device on said illumination path for receiving said beam of light and selectively reflecting said beam of light along a projection path;
   a lens system on said projection path, said lens system comprising:
      at least one lens; and
      an asymmetric aperture stop receiving light from at least one lens of said at least one lens, said asymmetric aperture stop blocking a crescent shaped portion of said received light.

2. The display system of claim 1, said asymmetric aperture stop forming a predominately circular aperture, said aperture having a side portion thereof blocked by said aperture stop.

3. The display system of claim 2, said side portion comprising a crescent shaped portion encroaching approximately 17% into said aperture.

4. The display system of claim 1, comprising at least one lens on said projection path following said asymmetric aperture stop on said projection path.

5. The display system of claim 1, said at least one lens comprising:
   a first lens group on said projection path between said micromirror and said asymmetric aperture stop; and
   a second lens group on said projection path on an opposite side of said asymmetric aperture stop from said first lens group.

6. The display system of claim 1, said asymmetric aperture stop comprising a circular portion and a blocked portion.

7. A method of projecting an image, the method comprising:
   receiving an illumination light beam along an illumination path;
   selectively reflected said illumination light beam along a projection path response to image data;
   focusing selectively reflected light using a projection lens; and
   blocking a crescent shaped portion of light passing through said projection lens using an asymmetric aperture.

8. The method of claim 7, said blocking step comprising:
   blocking said portion using an aperture stop forming a predominately circular aperture having an offset blocking region.

9. The method of claim 8, wherein said blocking region is a crescent shaped region having a radius equal to a radius of said circular aperture and a maximum thickness equal to 17% of a diameter of said circular aperture.

* * * * *